(12) United States Patent
Armstrong et al.

(10) Patent No.: US 7,041,150 B2
(45) Date of Patent: May 9, 2006

(54) PREPARATION OF ALLOYS BY THE ARMSTRONG METHOD

(75) Inventors: Donn Reynolds Armstrong, Lisle, IL (US); Richard Paul Anderson, Clarendon Hills, IL (US); Lance E. Jacobsen, Minooka, IL (US)

(73) Assignee: The University of Chicago, Chicago, IL (US)

( * ) Notice: Subject to any disclaimer, the term of this patent is extended or adjusted under 35 U.S.C. 154(b) by 294 days.

(21) Appl. No.: 10/654,493

(22) Filed: Sep. 3, 2003

(65) Prior Publication Data

US 2004/0079197 A1 Apr. 29, 2004

Related U.S. Application Data

(60) Provisional application No. 60/408,934, filed on Sep. 7, 2002.

(51) Int. Cl.
*B22F 9/28* (2006.01)
*C01B 21/06* (2006.01)
*C01B 31/30* (2006.01)
*C01B 35/04* (2006.01)

(52) U.S. Cl. .................. 75/351; 75/367; 75/617; 75/620; 423/76; 423/84; 423/297; 423/411; 423/440

(58) Field of Classification Search .................. 75/351, 75/367, 617, 620
See application file for complete search history.

(56) References Cited

U.S. PATENT DOCUMENTS

| | | | | |
|---|---|---|---|---|
| 2,607,675 A | * | 8/1952 | Gross | 75/593 |
| 3,085,872 A | * | 4/1963 | Griffiths | 75/395 |
| 4,070,252 A | * | 1/1978 | Bonsack | 203/29 |
| 5,779,761 A | | 7/1998 | Armstrong et al. | |
| 5,958,106 A | | 9/1999 | Armstrong et al. | |
| 6,409,797 B1 | | 6/2002 | Armstrong et al. | |

FOREIGN PATENT DOCUMENTS

NO 90840 1/1958

* cited by examiner

*Primary Examiner*—George Wyszomierski
(74) *Attorney, Agent, or Firm*—Emrich & Dithmar LLC; Harry M. Levy; James J. Hill

(57) ABSTRACT

A method and apparatus for making alloys or ceramics by the subsurface injection of an equilibrium vapor of a boiling liquid of the ceramic or alloys constituents is disclosed. Various powders and products are disclosed.

26 Claims, 1 Drawing Sheet

PREPARATION OF ALLOYS BY THE ARMSTRONG METHOD

RELATED APPLICATIONS

This application, pursuant to 37 C.F.R. 1.78(c), claims priority based on provisional application U.S. Provisional Application Ser. No. 60/408,934 filed Sep. 7, 2002.

BACKGROUND OF THE INVENTION

This invention relates to the Armstrong process as described in U.S. Pat. Nos. 5,779,761, 5,958,106 and 6,409,797, the disclosures of each of which is incorporated herein by reference. As disclosed in the above-three patents, alloys or ceramics can be prepared by establishing a mixture of gases which are fed, as disclosed in the above-referenced patents, subsurface to a reducing metal thereby to initiate the reduction of the gas mixture to the corresponding alloy or ceramic. In general, the most obvious way to provide the mixed vapor is to introduce the constituent vapors in the required atomic ratio to a manifold and feed the mixed material to the reducing metal.

The present invention relates to another means for mixing the alloy or ceramic constituents prior to the introduction of the mixed vapor to the reducing metal. In the present invention, the various constituents of the alloy or ceramic are initially mixed as a liquid which is thereafter boiled. After the liquid is boiled and reaches equilibrium, the vapor coming off the liquid has the same atomic ratio as the feed liquid to the boiler, which may or may not be different than the liquid in the boiler. At steady state, the vapor from the boiler can be fed to the Armstrong process in the same manner as illustrated in the three referenced patents to produce an alloy or ceramic having a constant atomic ratio.

This invention simplifies the handling of materials, and particularly those materials such as aluminum chloride which sublimate rather than boil. For those materials, the solid is heated in a vessel under pressure so that a liquid is formed and that liquid is thereafter transmitted to a boiler, as will be shown. By way of example a boiler having feed streams of aluminum chloride and vanadium chloride and titanium chloride in atomic ratios of 6% Al and 4% V and the remainder Ti will produce at equilibrium a vapor of 6% Al, 4% V and 90% Ti, even if the atomic ratios of the constituents of the liquid in the boiler differ. Using the equilibrium vapor as a feed in the process disclosed in the referenced patents produces a 6% Al, 4% V, titanium alloy.

The invention applies to a wide variety of alloys or ceramics and simplifies the materials handling of the constituent parts of each alloy produced in the Armstrong Process.

SUMMARY OF THE INVENTION

Accordingly, it is an object of the present invention to provide a method and apparatus of producing an alloy or ceramic in which the liquid constituents thereof are fed into a boiler and the equilibrium vapor therefrom is thereafter used in the subsurface reduction with a liquid alkali or alkaline earth metal to form the alloy or ceramic.

Yet another object of the present invention is to provide a method of producing an alloy or ceramic by the exothermic subsurface reduction of a mixed halide vapor of the alloy or ceramic constituents with liquid alkali or alkaline earth metal or mixtures thereof, comprising providing a liquid mixture of halides of the alloy or ceramic constituents in a preselected atomic ratio, boiling the liquid until an equilibrium with the vapor is attained, and thereafter introducing the equilibrium vapor into the liquid reductant metal to form an alloy or ceramic powder of the equilibrium vapor constituents in the preselected atomic ratio.

Still a further object of the present invention is to provide a method of producing an alloy by the exothermic subsurface reduction of a mixed halide vapor of the alloy constituents with liquid alkali or alkaline earth metal or mixtures thereof, comprising providing a liquid mixture of halides of the alloy constituents in a preselected atomic ratio, boiling the liquid until an equilibrium with the vapor is attained, and thereafter injecting the equilibrium vapor into the liquid reductant metal at greater than sonic velocity to form an alloy powder of the equilibrium vapor constituents in the preselected atomic ratio.

Another object of the present invention is to provide an apparatus for practicing the method hereinbefore discussed.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAIL DESCRIPTION OF THE PREFERRED EMBODIMENT

Figure 1:
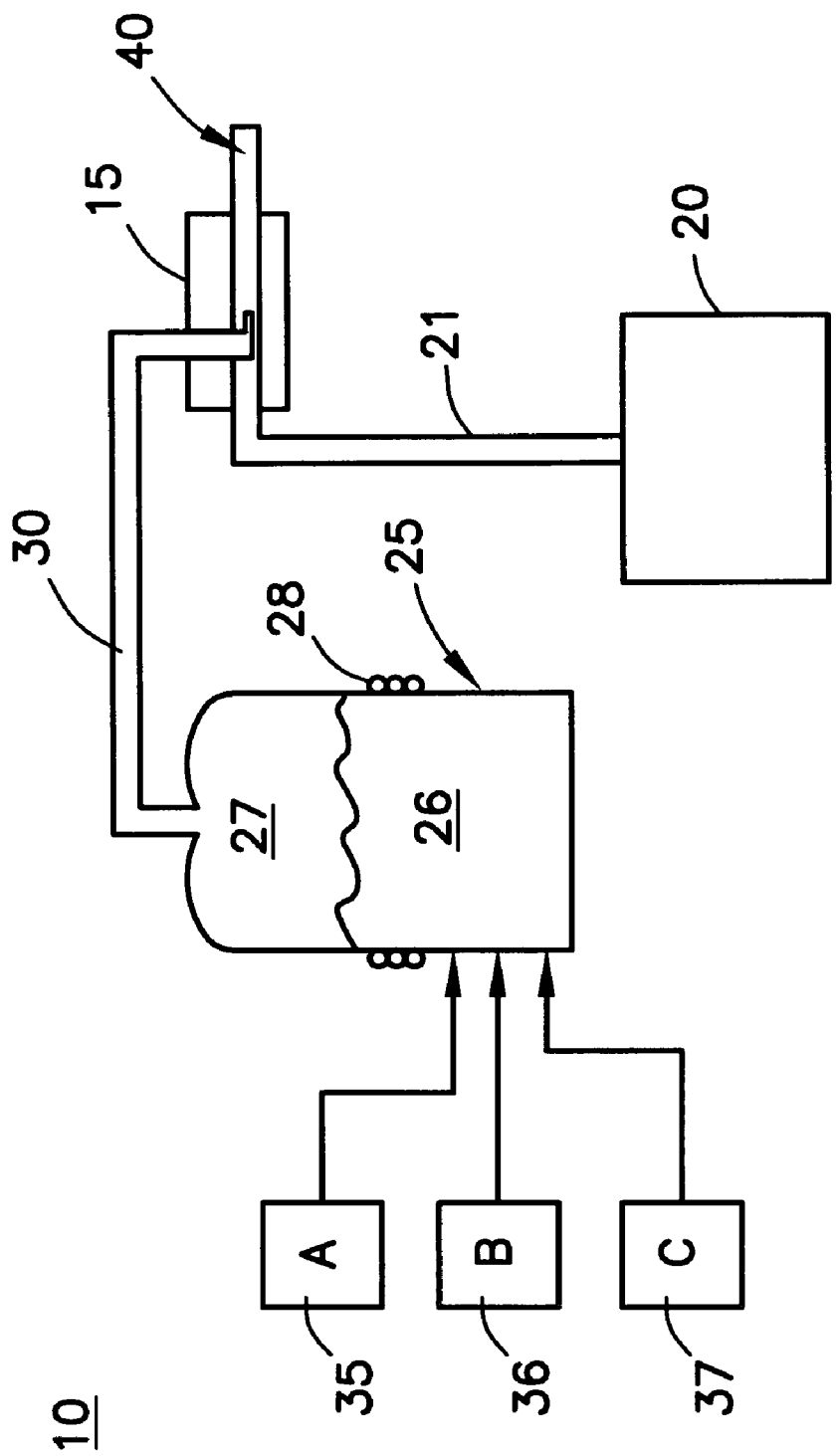
FIG. 1 is a schematic representation of the apparatus and system for practicing the method of the present invention.

FIG. 1 illustrates a system 10 having a reactor 15 in communication with a source 20 of liquid reductant metal connected to the reactor by a pipe 21.

A boiler 25 has therein a liquid 26 which when boiled produces at equilibrium a vapor 27 which is introduced via pipe 30 into the pipe 21 preferably but not necessarily carrying a flowing stream the liquid metal from the source thereof 20, thereby producing a slurry 40 of the same type, consisting of excess liquid metal, ceramic or metal powder and a salt produced during the reaction as discussed in the above referenced Armstrong et al. patents.

The boiler 25 is provided with a heat source such as coils 28 and is connected or in communication with a plurality of sources of the constituents of the ultimately produced alloy or ceramic. Three such sources 35, 36, and 37 being illustrated.

The advantage of the present invention is that during the production of a ceramic or an alloy by the Armstrong method, liquid handling is frequently easier and more efficacious than handling vapors. To this end, representative constituent sources 35, 36 and 37 can each be a vessel (pressurized or not) in which the individual constituent halide is maintained as a liquid and thereafter transferred in a suitable predetermined atomic ratio into the boiler 25. The atomic ratio of the constituents from each of the sources 35, 36 and 37 determines the atomic ratio of the constituents in the vapor 27 at equilibrium with the liquid 26. Thereafter, the equilibrium vapor 27 in the preselected and predetermined atomic ratios is injected subsurface into a stream of liquid metal at greater than sonic velocity, as is taught in the above-referenced Armstrong patents.

Although the reductant metal may be any suitable alkali or alkaline earth metal or mixtures thereof, the preferred reductant metal is sodium or magnesium, the most preferred reductant metal being sodium. Although a variety of halides may be used, the preferred halide is a chloride due to availability and cost. Although frequently described with respect to titanium, the invention is in fact applicable to a wide variety of alloys and ceramics, particularly ceramics including a nitride, a carbide, or a boride or mixtures thereof. In addition, many alloys may be produced by the method and apparatus of the subject invention, particularly those alloys or ceramics that include one or more of Ti, Al, Sb, Be, B, Ta, Zr, V, Nb, Mo, Ga, U, Re, or Si. More preferably, alloys or ceramics are produced which include one or more of Ti, Al, Ta, Zr, V, Nb, Mo, Ga, Re, or Si.

Moreover, the powder ceramics or alloys produced by the method and apparatus of the present invention are useful in a wide variety of processes to make many different products. For instance, various powder metallurgy techniques may be used to produce product from the powder made by the method and apparatus of the present invention. Moreover, a wide variety of alloy and ceramic powders may be either melted or compressed to form a solid from the powder of the present invention. A particularly important alloy at the present time is the 6:4 alloy of titanium. This alloy is widely used in aerospace and defense and is substantially 6% aluminum and 4% vanadium with the remainder being substantially titanium.

As taught in the cited Armstrong et al. patents, the reductant metal is generally present in excess of the stoichiometric amount needed to reduce the mixed halide vapor injected subsurface of the reductant metal. More particularly, when the reductant metal is present in the range of from about 20 to about 50 times the stoichiometric amount, which enables the entire steady state reaction to be maintained at or around 400° C., an advantageous and mostly preferred temperature. The exact temperature at which the steady state reaction is maintained depends, in part, upon the ratio of halide to reductant metal, as well as the individual vapors being reduced and the reductant metals used to reduce same. It is within the skill of the art to calculate the exact ratios required to provide a predetermined steady state operating temperature for the process producing any of the wide variety of ceramics or alloys made by the method and apparatus of the present invention.

As previously stated, although the examples herein are discussed with respect to titanium or titanium alloys, a wide variety of alloys and ceramics may be made by the present invention and it is intended to cover in the claims appended hereto, all such alloy and ceramics particularly, but not exclusively, the nitride, boride or carbide ceramics. Representative alloys of the present invention are those which include one or more of Ti, Al, Sb, Be, B, Ta, Zr, V, Nb, Mo, Ga, U, Re, or Si and most preferably one or more of Ti, Al, Ta, Zr, V, Nb, Mo, Ga, Re, or Si.

While there has been disclosed what is considered to be the preferred embodiment of the present invention, it is understood that various changes in the details may be made without departing from the spirit, or sacrificing any of the advantages of the present invention.

What is claimed is:

1. A method of producing an alloy or ceramic by the exothermic subsurface reduction of a mixed halide vapor of the alloy or ceramic constituents with liquid alkali or alkaline earth reductant metal or mixtures thereof, comprising providing a liquid mixture of halides of the alloy or ceramic constituents in a preselected atomic ratio, boiling the liquid mixture of halides until an equilibrium with the vapor is attained, and thereafter introducing the equilibrium vapor into the liquid reductant metal to form an alloy or ceramic powder of the equilibrium vapor constituents in the preselected atomic ratio.

2. The method of claim 1, wherein the reductant metal is Na or Mg.

3. The method of claim 2, wherein the halide is a chloride.

4. The method of claim 3, wherein the alloy is principally Ti.

5. The method of claim 4, wherein the alloy is principally Ti and includes Al and V.

6. The method of claim 5, wherein the alloy is substantially 6% Al and 4% V with the remainder substantially Ti.

7. The method of claim 1, wherein the reductant metal is present in excess of the stoichiometric amount.

8. The method of claim 7, wherein the reductant metal is present in the range of from about 20 to about 50 times the stoichiometric amount.

9. The method of claim 7, wherein the reductant metal is present as a flowing stream.

10. The method of claim 1, wherein the vapor is introduced into the liquid metal by subsurface injection at greater than sonic velocity.

11. The method of claim 1, wherein the ceramic is one or more of a nitride or a carbide or a boride or a mixture thereof.

12. The method of claim 1, wherein the alloy includes one or more of Ti, Al, Sb, Be, B, Ta, Zr, V, Nb, Mo, Ga, U, Re, or Si.

13. The method of claim 12, wherein the alloy includes one or more of Ti, Al, Ta, Zr, V, Nb, Mo, Ga, Re, or Si.

14. The method of claim 1, wherein at least some of the liquid halides are under pressure prior to forming the liquid mixture of halides.

15. A method of producing an alloy by the exothermic subsurface reduction of a mixed halide vapor of the alloy constituents with liquid alkali or alkaline earth reductant metal or mixtures thereof, comprising providing a liquid mixture of halides of the alloy constituents in a preselected atomic ratio, boiling the liquid mixture of halides until an equilibrium with the vapor is attained, and thereafter injecting the equilibrium vapor into the liquid reductant metal at greater than sonic velocity to form an alloy powder of the equilibrium vapor constituents in the preselected atomic ratio.

16. The method of claim 15, wherein the reductant metal is Na or Mg.

17. The method of claim 16, wherein the halide is a chloride.

18. The method of claim 17, wherein the alloy is principally Ti.

19. The method of claim 18, wherein the alloy is principally Ti and includes Al and V.

20. The method of claim 19, wherein the alloy is substantially 6% Al and 4% V with the remainder substantially Ti.

21. The method of claim 20, wherein the reductant metal is present in excess of the stoichiometric amount.

22. The method of claim 21, wherein the reductant metal is present in the range of from about 20 to about 50 times the stoichiometric amount.

23. The method of claim 22, wherein the reductant metal is present as a flowing stream.

24. The method of claim 15, wherein the reductant metal is Na and the halide is a chloride and the alloy includes one or more of Ti, Al, Sb, Be, B, Ta, Zr, V, Nb, Mo, Ga, U, Re, or Si.

25. The method of claim 24, wherein the alloy includes one or more of Ti, Al, Ta, Zr, V, Nb, Mo, Ga, Re, or Si.

26. The method of claim 15, wherein one or more of the liquid halides is maintained under pressure.

* * * * *